Patented Mar. 19, 1929.

1,705,868

UNITED STATES PATENT OFFICE.

GEORG KRÄNZLEIN, HEINRICH VOLLMANN, HEINRICH GREUNE, AND ARTHUR WOLFRAM, OF HOCHST-ON-THE-MAIN, GERMANY, ASSIGNORS TO GRASSELLI DYESTUFF CORPORATION, OF NEW YORK, N. Y., A CORPORATION OF DELAWARE.

BENZANTHRONES SUBSTITUTED IN THE BZ. NUCLEUS AND PROCESS FOR PREPARING THE SAME.

No Drawing. Application filed March 31, 1927, Serial No. 180,055, and in Germany April 3, 1926.

Our present process relates to the preparation of benzanthrones.

We have found that a benzanthrone substituted in the Bz. nucleus can be produced by condensing an anthraquinone compound reduction product containing oxygen in the central nucleus thereof, for instance an anthrone, anthranol or oxanthranol by means of an acid agent with an α-β-unsaturated carboxyl compound of the general composition:

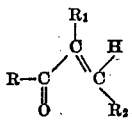

wherein R stands for alkyl or aryl or hydroxyl or alkoxyl; $R_1$ stands for any univalent residue, for instance hydrogen, halogen, hydroxyl, alkoxyl, alkyl, aryl, aralkyl, acyl, aroyl, carboxylic ester or the like and $R_2$ stands for hydrogen, halogen, hydroxyl, alkoxyl, alkyl, aryl, carboxyl or carboxylic ester. The reaction between anthrone (or anthranol) for instance and the said α-β-unsaturated carbonyl compounds takes place in such a manner that primarily an addition of the anthrone to the double linkage occurs with formation of a colorless, well crystallizing intermediate product of the type illustrated by the Formulæ I and II following hereafter, which intermediate product, in many cases, has pharmaceutical properties. Some of these addition products have already been prepared by Meerwein (see Journal für praktische Chemie Vol. 97, pages 284 ff).

Now, contrary to the statement by the above mentioned author Meerwein that the said addition compounds, when heated with concentrated acids, are re-split up into their components, we have found that from these addition compounds when working in a suitable manner, i. e. by using an acid condensing agent, there may in all cases be obtained the corresponding benzanthrones by the closure of the ring, as may be illustrated by the following formulæ:

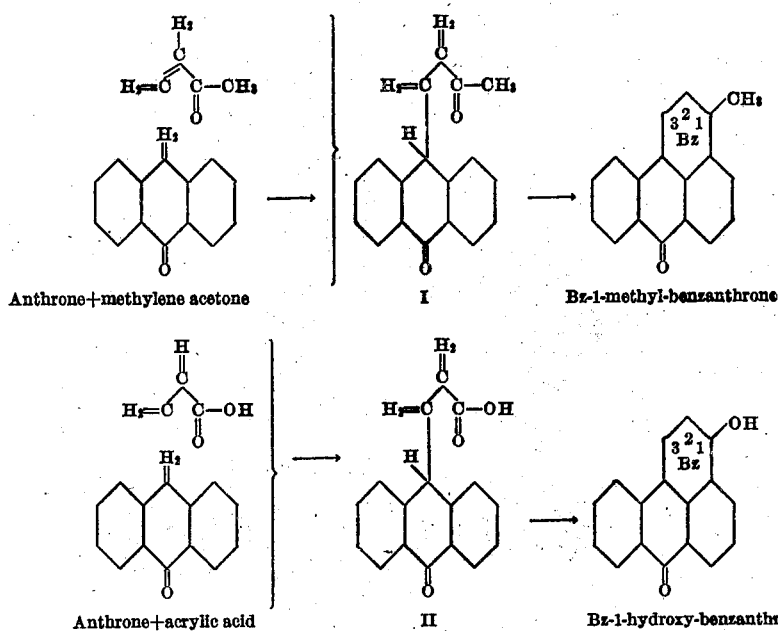

The condensation to a benzanthrone may be effected either by isolating the addition compounds (Type I and II) and closing the ring by a second operation, or by performing the addition and the closure of the ring by a single operation.

Both working methods are illustrated hereafter by a great number of examples.

The same results may be obtained when using in the process above described such compounds of the type referred to, in which the α-β double-linkage has been exchanged for a simple one by the addition of water or hydrogen halide. Thus for instance methyleneacetone

may be substituted by ketobutanol

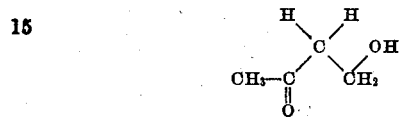

which on its part is easily transformed into methyleneacetone. By elimination of water, there is obtained the same methylbenzanthrone by condensation with anthrone in a solution with sulfuric acid. In a quite analogous manner behaves the phenylvinylketone:

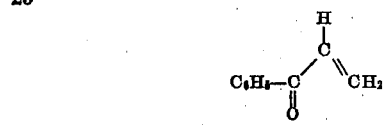

and the β-chlorpropionphenone:

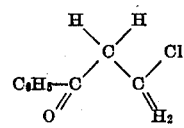

both of which yield one and the same phenylbenzanthrone.

We have furthermore found that a compound of the above mentioned general type, wherein R and $R_2$ represent hydroxyl or alkoxyl, is capable of very easily entering into reaction even without using an acid condensing agent with an oxygen-containing reduction product of an anthraquinone with formation of a benzanthrone derivative. Compounds of this kind are for instance the hydroxy- or alkoxy-methylene-carboxylic ester. Thus by simply heating the ethoxymethylenemalonic acid diethylester:

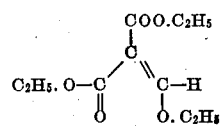

with anthrone in a quinoline solution the Bz-1-hydroxy-Bz-2-benzanthronecarboxylic ethylester is obtained:

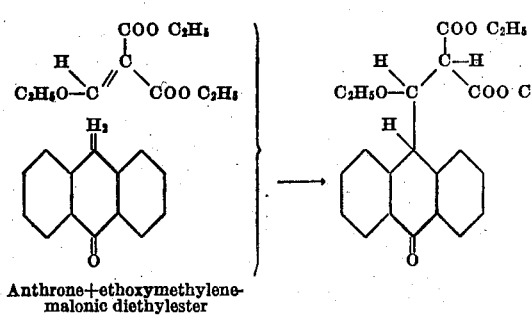
Anthrone+ethoxymethylene-
malonic diethylester

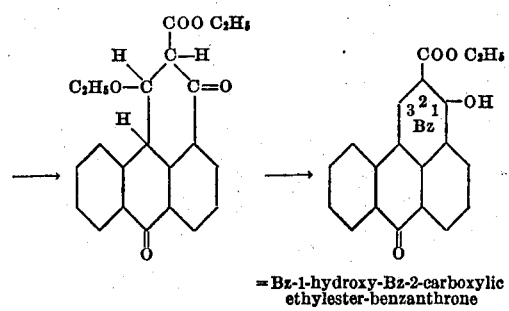
= Bz-1-hydroxy-Bz-2-carboxylic
ethylester-benzanthrone

When condensing maleic acid or fumaric acid (according to the general structural formula: $R=OH$, $R_1=H$, $R_2=COOH$ stated at the beginning of the specification) with an anthrone one carboxyl group is split off while closing the ring by means of aluminium chloride so as to form the benzanthrone. The course which the reaction takes when for instance maleic anhydride is used, may be explained by the following formulæ:

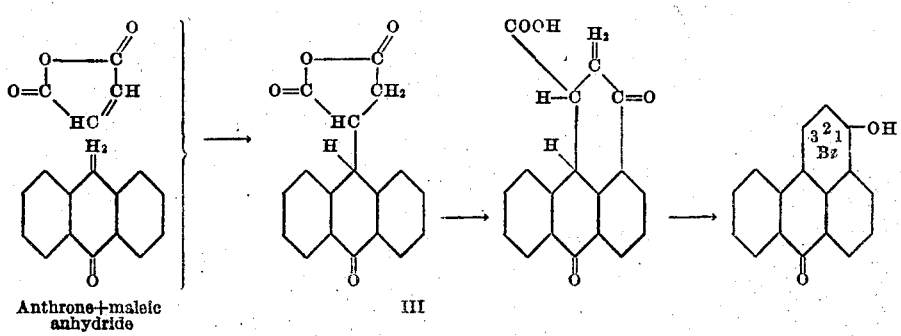
Anthrone+maleic
anhydride
III

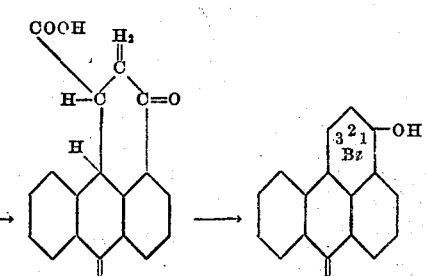

The benzanthrone derivatives thus obtained, often with a very good yield, show the properties which are characteristic for benzanthrone and they are valuable parent materials for the manufacture of dyestuffs.

The following examples serve to illustrate our invention but they are not intended to limit it thereto; the parts are by weight:

1. 19,4 parts of anthrone are well mixed with 7,5 parts of methylene acetone of the formula H$_2$C=CH.CO.CH$_3$ (obtainable from ketobutanol by elimination of water according to the process described in German patent specification No. 222,551) and this mixture is slowly introduced into a mixture heated to 100–110° C. prepared from 180 parts of concentrated sulfuric acid and about 55 parts of water, and the whole is stirred at 110–115° C. until all of the anthrone has disappeared. After cooling, the solution which has a beautiful red color with an intense fluorescence, is poured on ice, the precipitate is filtered by suction, washed until neutral and re-vatted by means of caustic soda solution and hydrosulfite in order to eliminate therefrom any traces of anthraquinone which may still be present. The residue is then further purified either by re-crystallizing it from an organic solvent as for instance ethyl alcohol, benzene or glacial acetic acid or by distilling it with superheated steam. Thus methylbenzanthrone is obtained crystallizing in beautiful yellow needles melting at 164° C. and in which the methyl residue probably stands in the Bz-1-position.

Instead of the methyleneacetone as used in the foregoing example there may be used with the same result the ketobutanol CH$_3$–CO–CH$_2$–CH$_2$OH.

2. 80 parts of anthranol are intimately mixed with 57 parts of methylene-acetophenone (phenylvinylketone) of the formula

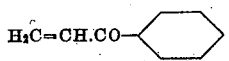

obtainable according to the process described in "Berichte der deutschen chemischen Gesellschaft" volume 36, page 1354, and this mixture is gradually introduced into a mixture, heated to about 100–110° C. of 900 parts of concentrated sulfuric acid and 275 parts of water, and the whole is stirred at 110–120° C. until all of the anthrone has disappeared. The mass is worked up as indicated in Example 1. The Bz-1-phenylbenzanthrone thus obtained crystallizes in beautiful yellow needles dissolving in concentrated sulfuric acid to a blood-red solution with an intense fluorescence. The phenylbenzanthrone can be easily re-crystallized from the usual organic solvents as for instance ethyl alcohol, benzene, glacial acetic acid or the like and melts at 183° C. There may, of course, also be used the phenylketopropanol

C$_6$H$_5$CO–CH$_2$–CH$_2$–OH which corresponds to the ketobutanol referred to in Example 1.

3. 13 parts of the sodium salt of (hydroxymethylenemethyl)-ethyl-ketone

are dissolved in 40 parts of glacial acetic acid and this solution is added to another solution of 19 parts of anthrone in 100 parts of sulfuric acid of 62° Bé. While the temperature of the mass spontaneously rises, the originally yellow color of the solution of the anthrone changes first to green and afterwards to greenish-blue (first phase of the reaction). On heating to about 110° C. the solution finally assumes a pure red color. After having stirred the mass at this temperature for one hour it is poured on ice water and the Bz-1-Bz-2-dimethylbenzanthrone, which has separated in the form of yellow flakes, is ther isolated. It crystallizes from glacial acetic acid in yellow needles melting at 207° C. In concentrated sulfuric acid it is soluble to a red solution with a reddish-brown fluorescence.

4. 13 parts of sodium hydroxymethyleneacetone of the formula HOHC=CH.CO.CH$_3$ (cf. "Berichte" volume 21 page 2144 and volume 22 page 3274) are condensed with anthrone in the manner indicated in Example 3. Also in this case the course of the reaction is clearly visible by the color of the solution which changes from greenish-red first to bluish-red and then to carmine red. The Bz-1-methylbenzanthrone which is separated from the carmine red solution by the action of water is identical with the product obtained according to Example 1. The formation of benzanthrone in this case is all the more surprising as the great tendency of the hydroxymethylene acetone to become condensed by itself with formation of triacetylbenzene is well known.

5. 19 parts of anthrone are condensed with 25 parts of sodium (hydroxymethyleneethyl)-ethylketone

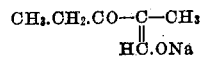

as indicated in Example 3. The Bz-1-ethyl-Bz-2-methyl-benzanthrone thus obtained crystallizes from alcohol in long yellow needles melting at 142° C.

6. Into a mixture, heated to 60° C., of 100 parts of sulfuric acid of 66° Bé., 10 parts of water and 30 parts of glacial acetic acid is introduced by portions a mixture of 19,4 parts of anthrone and 21 parts of benzylidene-acetophenone of the formula

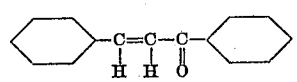

and the whole is kept at a temperature above 60° C. until the formation of the benzanthrone is finished. The mass can be worked up as indicated in Example 1. Thus a body is obtained which crystallizes in yellow needles, melting at 195–196° C., and dissolves in concentrated sulfuric acid to a red solution with an intense fluorescence, its constitution being probably that of a Bz-1-Bz-3-diphenylbenzanthrone.

7. Into a mixture, heated to 60° C., of 100 parts of sulfuric acid of 66° Bé., 10 parts of water and 30 parts of glacial acetic acid, is gradually introduced an intimate mixture of 19,4 parts of anthrone with 15 parts of benzylidene-acetone of the formula

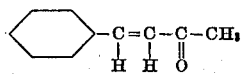

and the whole is heated to a temperature exceeding 60° C., until the formation of the benzanthrone is complete. The product is worked up as indicated in Example 1. The crude product is freed from any anthraquinone which may be present and purified by distillation with superheated steam, and then yields when recrystallized from an organic solvent a Bz-methyl-Bz-phenyl-benzanthrone crystallizing in yellow needles and melting at 175–176° C. It is soluble in concentrated sulfuric acid to a red solution with an intense fluorescence and is probably isomeric with the Bz-methyl-Bz-phenyl-benzanthrone described in Example 9.

8. Into a mixture, heated to about 100° C., of 50 parts of glacial acetic acid and 92 parts of sulfuric acid of 73% strength is introduced drop by drop in the course of an hour a solution, heated to about 70° C., of 20 parts of anthrone and 10 parts of ethylidene acetone of the formula $H_3C.CH=CH.CO.CH_3$, (prepared as described by Claisen in "Liebigs Annalen der Chemie" volume 306 page 325) in 50 parts of glacial acetic acid. The temperature is then raised to 110° C. and the reaction mixture is stirred at this temperature until the anthrone has disappeared for the most part. The mixture is then poured on ice, the precipitate is filtered by suction and washed until neutral. In order to purify the substance it is distilled with steam superheated to 300° C. After having freed the product by re-vatting from any small quantities of anthraquinone which may be present, a brown-colored mass is obtained, crystallizing from methyl alcohol in the form of yellow needles melting at 114–115° C. The mode of origin and analysis show that the product is most probably the Bz-1-Bz-3-dimethylbenzanthrone. It dissolves in concentrated sulfuric acid to a red solution with a red fluorescence.

The same product is obtained by substituting for the ethylidene acetone the hydracetylacetone $$CH_3-CO-CH_2-CH-CH_3$$
$$\qquad\qquad\qquad\;\; |$$
$$\qquad\qquad\qquad\; OH$$

9. 12 parts of anthrone and 10,5 parts of ethylidene-acetophenone of the formula

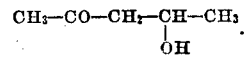

(prepared according to the indications of Staudinger and Kohn in "Liebigs Annalen der Chemie" volume 384 page 124) are dissolved in 250 parts of sulfuric acid of 82% strength and the solution thus prepared is slowly heated, while stirring. At 50° C. the solution assumes a yellowish-red coloration with a like fluorescence. At 80° C. the color as well as the fluorescence change to red. The mixture is stirred at this temperature until all of the anthrone has disappeared. The solution is worked up as indicated in Example 1. The new benzanthrone crystallizes from alcohol in the form of brown needles of the melting point 174–175° C. The color of its solution in concentrated sulfuric acid is red with a red fluorescence. From the manner in which it is formed it may be concluded that the product obtained is a Bz-phenyl-Bz-methylbenzanthrone.

The same product can be obtained by substituting for the ethylidene-acetophenone the 2-benzoylisopropylalcohol $$C_6H_5-CO-CH_2-CH-CH_3$$
$$\qquad\qquad\qquad\qquad\; |$$
$$\qquad\qquad\qquad\qquad OH$$

10. 210 parts of oxanthrone of the formula

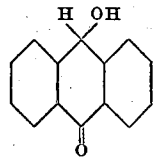

are dissolved in 500 ccm. of concentrated sulfuric acid and the solution thus obtained is diluted by adding thereto 70 ccm. of water. Into this solution are introduced drop by drop at about 100° C., while stirring, 169 parts of β-chloropropionephenone dissolved in 50 ccm. of hot glacial acetic acid. The solution which is at first yellow becomes temporarily bluish-green, hydrochloric acid gas being evolved with slight frothing. On stirring for a short time at 115° C. the color of the solution changes to carmine red. The solution is stirred for another hour at 110–120° C. and then poured into water whereby brownish-yellow flakes are formed, which are filtered by suction, washed and dried. The Bz-1-phenylbenzanthrone thus prepared can be purified either by recrystallizing it from glacial acetic acid or by subliming it with superheated steam. It then forms yellow needles melting at 183–184° C., dissolving in concentrated sulfuric acid to a carmine red solution with an intense red fluorescence. Its solution in alcohol shows an intense yellowish-green fluorescence. The product is identical with that described in Example 2.

11. (a) 19 parts of anthrone are heated together with 20 parts of para-methoxy-β-chloropropionephenone

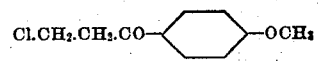

(the latter has its melting point at 64° C. and can be prepared from β-chloropropionylchloride and anisole by the action of aluminium chloride). At 100–120° C. a strong evolution of hydrogen chloride sets in. When the evolution of hydrogen chloride is finished the mass is diluted with 100 parts of hot alcohol. The condensation product thus formed precipitates in the form of colorless crystals which after re-crystallization from alcohol melt at 181° C.

(b) 20 parts of the intermediate product so prepared are heated to about 100° C. with 150 parts of sulfuric acid of 62° Bé. until the solution which is at first colorless has assumed an intense bluish-red color. On isolating in the usual manner, a body, probably the Bz-1-para-methoxyphenylbenzanthrone, is obtained which crystallizes from glacial acetic acid in the form of yellow needles melting at 186° C. The color of its solution in concentrated sulfuric acid is bluish-red with a brownish-red fluorescence.

12. 194 parts of anthrone and 250 parts of ethoxymethyleneacetylacetone of the formula

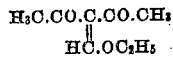

are mixed with 2000 parts by volume of sulfuric acid of 62° Bé. and this mixture is stirred for about 1 hour at 95° C. From the solution, which during the heating operation assumes an intense red color, the benzanthrone which has formed is precipitated with water. On re-crystallizing it from glacial acetic acid long yellow needles are obtained melting at 165° C. The product is identical with the Bz-1-methylbenzanthrone described in Example 1.

13. 19 parts of anthrone are dissolved in 100 parts of sulfuric acid of 66° Bé. and this solution is diluted by addition of 10 parts of water. There is then added thereto at about 60° C. a solution of 21 parts of hydroxymethylene-acetoacetic ester of the formula

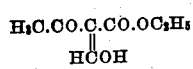

in 30 parts of glacial acetic acid. The color of the solution which is originally brownish-yellow changes first to bluish-violet and then to carmine red. After having stirred for a short time at 100° C. the solution is poured into water; the crude product is freed from any anthrone and anthraquinone which may still be present by means of an alkaline hydrosulfite solution, and dried. In order to purify it, it may be re-crystallized from nitrobenzene. The body forms golden-yellow needles melting at 295° C. and is probably the Bz-1-hydroxy-Bz-2-acetylbenzanthrone. It dissolves in an aqueous alkali solution which is of a carmine red color. The color of its solution in concentrated sulfuric acid is carmine red with a brownish-red fluorescence.

The hydroxymethylene-benzoyl-acetic ester of the formula

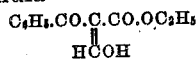

can be condensed with anthrone in the same manner as the hydroxymethylene-acetoacetic ester.

14. 100 parts of anthrone are boiled in a reflux apparatus for a quarter of an hour together with 100 parts of ethoxy-methylenacetoacetic ester of the formula

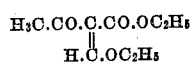

in quinoline. On cooling the condensation product crystallizes forthwith in the form of golden-yellow needles. It is identical with that obtainable according to Example 13.

15. Equivalent quantities of anthrone and ethoxymethylenemalonic-acid-diethylester of the formula

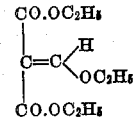

are heated to boiling in a small quantity of quinoline in a reflux apparatus for a quarter of an hour. After cooling the solution is diluted with some alcohol and the separated body is washed with alcohol. By re-crystallization from glacial acetic acid yellow needles are obtained melting at 206° C. The color of their solution in concentrated sulfuric acid and in alcoholic alkalies is carmine red with an intense brownish-red fluorescence. From the manner in which the body is formed and from its properties it may be concluded that it is probably the Bz-1-hydroxy-Bz-2-benzanthrone-carboxylic-ester.

16. 194 parts of anthrone are dissolved in 10 times their quantity of concentrated sulfuric acid, and to this solution are added 300 parts of glacial acetic acid and 250 parts of hydroxymethylene-phenylacetic-ester of the formula

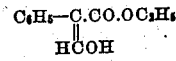

(prepared according to the directions of Wislicenus in "Annalen der Chemie" volume 291, page 164). On heating, the color of the solution, which is originally yellow, changes first to green and then to blue. When all anthrone is converted, the blue solution is poured into water. If the precipitating crude product is contaminated by resin-like accompanying substances, it is sufficient to heat the product for a short time after addition of some alcohol and to filter it by suction in order to obtain it in a perfectly pure state. The body which is most probably the Bz-1-hydroxy-Bz-2-phenylbenzanthrone, crystallizes from glacial acetic acid in the shape of orange-colored needles melting at 230° C. and dissolves in concentrated sulfuric acid and in aqueous alkali solutions with a pure blue color.

17. 194 parts of anthrone are molten and into the melt are introduced at about 160° C. 100 parts of maleic anhydride of the formula

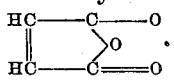

The reaction which now sets in is apparent from the rise of the temperature. The mixture is heated for some minutes to 240° C., diluted by the addition of 600 parts by volume of hot nitrobenzene and then allowed to cool. The condensation product so obtained crystallizes in the form of colorless large flat prisms melting at 215° C. and has probably the formula indicated in the description under III.

100 parts of the intermediate product thus produced are suspended in 1000 parts by volume of nitrobenzene, and to this suspension are added 200 parts of powdered dry aluminium chloride. The solution is gradually heated on the water-bath until it has assumed a deep reddish-violet color which is obtained after a short time. Water is then added thereto and the nitrobenzene is blown off with steam.

Thus the Bz-1-hydroxybenzanthrone is obtained in the form of reddish-brown flakes dissolving in an aqueous alkali solution, or in concentrated sulfuric acid to a reddish-violet solution. Its solution in concentrated sulfuric acid shows an intense red fluorescence. The Bz-1-hydroxybenzanthrone crystallizes from high-boiling solvents in the shape of reddish-orange needles of the melting point 317° C.

18. 194 parts of anthrone are heated with 175 parts of fumaric-acid-diethylester of the following formula:

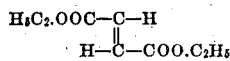

in 3000 parts by volume of concentrated sulfuric acid. The solution which is at first yellow, finally assumes at about 140° C. a pure carmine red color with an intense red fluorescence. On pouring the melt into water and salting out the solution, the resulting Bz-1-hydroxybenzanthronesulfonic acid is isolated. The yellow solution of the sulfonic acid in water assumes, on addition of an alkali, a reddish-violet color.

19. 150 parts of anthrone are dissolved in 600 ccm. of concentrated sulfuric acid, and to this solution are added 100 parts of water. Into the solution of the anthrone is then introduced at 80° C. a solution of 70 g. of acrylic acid in 150 ccm. of glacial acetic acid. The temperature rises thereupon to about 100° C. The solution is stirred at this temperature for a short time, whereby its color becomes violet-red, then it is poured into water and the hydroxybenzanthrone which separates in the form of orange-brown flakes, is isolated. It is identical with the Bz-1-hydroxybenzanthrone described in Example 17.

The same hydroxybenzanthrone can be obtained in a similar way by subjecting β-chloropropionic acid instead of acrylic acid to reaction with anthrone.

20. 200 parts of anthrone are mixed with 400 parts of β-chloropropionic acid and this mixture is stirred for five hours at 130–150° C. hydrochloric-acid gas being evolved. Water is then added to the mixture and the separated oily product is well washed. The excess of β-chloropropionic acid can be recovered by evaporating the aqueous solution.

The separated oily product is extracted with an aqueous ammonia or dilute sodium carbonate solution, filtered, and from the solution thus obtained which, is required, has been clarified by means of a small quantity of animal charcoal, the β-anthronylpropionic acid is separated in the form of a clear, at first oily product.

On re-crystallizing the β-anthronylpropionic acid from dilute methanol or dilute glacial acetic acid it is obtained as colorless, brilliant needles or laminæ melting at 181° C.

The solution of β-anthronylpropionic acid in concentrated sulfuric acid is faintly yellow. On heating the solution to about 150° C., it assumes a pure carmine red color with a red fluorescence, while the closure of the ring to Bz-hydroxybenzanthrone and at the same time sulfonation takes place.

By melting the β-anthronylpropionic acid with sodium-aluminium chloride at about 180° C. the Bz-1-hydroxybenzanthrone is obtained, which is soluble in alkalies to a violet solution. The closure of the ring can also be effected by heating with phosphorous oxychloride.

21. 194 parts of anthrone are intimately mixed with 86 parts of crotonic acid, and the mixture is heated with 2 parts of piperidine in a closed vessel to 200° C. for five hours, while slowly stirring. Thus a light yellow resin is obtained which is afterwards dissolved in hot methyl alcohol. On adding hot water to the solution and allowing it to stand for some time, the β-anthronyl-β-methylpropionic acid is precipitated as colorless prisms melting at 160° C.

Into 300 parts of chlorosulfonic acid are caused to run, while cooling and stirring, 700 parts of glacial acetic acid. Thereupon 120 parts of β-anthronyl-β-methylpropionic acid are added to the mixture. The temperature is raised to 80° C. in the course of an hour and then allowed to fall again slowly. The melt is decomposed with ice and diluted with water, boiled again and filtered. The residue is once more boiled in much water and then dissolved in dilute hot caustic soda solution, wherein it is soluble to a bluish-violet solution. On acidifying the filtered solution yellowish-brown flakes of Bz-1-hydroxy-Bz-3-methylbenzanthrone are obtained, crystallizing from a mixture of glacial acetic acid and nitrobenzene in the form of yellowish-brown needles melting at 287° C. The compound dissolves in concentrated sulfuric acid to a reddish-violet solution.

22. 198 parts of anthrone are intimately mixed with 148 parts of cinnamic acid of the following formula:

$$C_6H_5.CH=CH-COOH,$$

and the mixture is heated together with a small quantity, about 2-3 parts, of piperidine, suitably in a sealed vessel, while slowly stirring for 6 hours to 170-180° C. the temperature being measured in the melt. Thus a light yellow resin is produced which soon solidifies. This resin is dissolved in boiling xylene, and on cooling the solution, colorless prisms of β-anthronyl-β-phenylpropionic acid are obtained melting at 197° C. (cf. Meerwein "Journal für praktische Chemie", volume 97, page 286, 1918).

Into 600 parts of chlorosulfonic acid are caused to run, drop by drop, while cooling with ice and well stirring, 900 parts of glacial acetic acid, and to this mixture are added at about 40° C. 200 parts of β-anthronyl-β-phenylpropionic acid. At about 60° C. the solution begins to change its color and becomes violet with a red hue. The temperature is for a short time raised in the course of an hour up to 80° C. and then allowed to go down again slowly. After the melt has been poured on ice and diluted with water, it is boiled up for some time and filtered by suction. Boiling is once more repeated, and thus a yellowish-brown product is obtained, which for being purified, is dissolved in dilute hot caustic soda solution, wherein it is soluble to a violet solution. The filtered alkaline solution is acidified and then yields orange-colored flakes constituting pure Bz.1-hydroxy-Bz-3-phenylbenzanthrone. The compound crystallizes from glacial acetic acid or nitrobenzene in the shape or orange-colored needles which melt, but not sharply, at 320° C. The color of its solution in concentrated sulfuric acid is when seen in a thick layer blue, in a thin layer red. In a reflected light the solution in sulfuric acid also appears to be red-colored.

23. 10 parts of anthronebenzalmalonic-acid-diemthylester of the formula

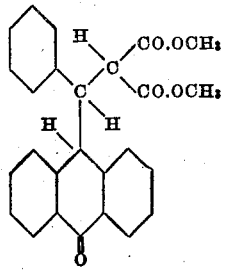

are dissolved in 100 parts of oleum of 20% strength. This solution which is originally greenish-yellow assumes at 100° C. a red color and is stirred at the said temperature for about 10 minutes. The melt is then poured on ice, the acid is neutralized by means of chalk, the whole is boiled up, the residue is filtered by suction and well washed with hot water. The solution yields on evaporation the yellow calcium salt of the sulfonic acid of Bz.1-hydroxy-Bz.3-phenylbenzanthrone.

Instead of the unsubstituted oxygen-containing reduction products of anthraquinone named in the foregoing examples, there may also be used the various reduction products of substituted anthraquinones, as for instance 2-methylanthrone, chloroanthrone or the like.

It is to be understood that, in the process hereinafter claimed, one may use instead of compounds of the general Formula I

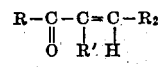

likewise compounds of the general Formula II

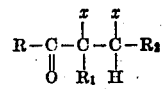

wherein one $x$ represents hydrogen and the other $x$ represents one of the substituents halogen and hydroxyl, which latter compounds easily can be converted into compounds of general Formula I by splitting off hydrogen halide, or water, and therefore are to be considered as equivalents of compounds of general Formula I.

We claim:

1. Process which comprises condensing with an anthraquinone compound reduction product, containing oxygen in the central nucleus thereof, in the presence of a condensing agent having an acid reaction, a carbonyl compound of the general formula:

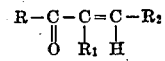

wherein R represents one of the groups alkyl, aryl, hydroxyl and alkoxyl, $R_1$ represents any univalent residue, and $R_2$ represents one of the substituents hydrogen, halogen, hydroxyl, alkoxyl, alkyl, aryl, carboxyl, and carboxylic ester.

2. Process which comprises condensing with an anthraquinone compound reduction product, containing oxygen in the central nucleus thereof, in the presence of sulfuric acid, a carbonyl compound of the general formula:

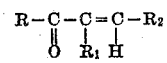

wherein R represents one of the groups alkyl, aryl, hydroxyl, and alkoxyl, $R_1$ represents any univalent residue, and $R_2$ represents one of the substituents hydrogen, halogen, hydroxyl, alkoxyl, alkyl, aryl, carboxyl, and carboxylic ester.

3. Process which comprises condensing with an anthraquinone compound reduction product, containing oxygen in the central nucleus thereof, in the presence of a condensing agent having an acid reaction, and at temperatures above about 50° C., a carbonyl compound of the general formula

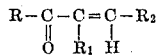

wherein R represents one of the groups alkyl, aryl, hydroxyl, and alkoxyl, $R_1$ represents any univalent residue, and $R_2$ represents one of the substituents hydrogen, halogen, hydroxyl, alkoxyl, alkyl, aryl, carboxyl and carboxylic ester.

4. Process which comprises condensing with an anthraquinone compound reduction product, containing oxygen in the central nucleus thereof, in the presence of sulfuric acid and at temperatures above about 50° C., a carbonyl compound of the general formula

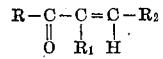

wherein R represents one of the groups alkyl, aryl, hydroxyl and alkoxyl, $R_1$ represents any univalent residue, and $R_2$ represents one of the substituents hydrogen, halogen, hydroxyl, alkoxyl, alkyl, aryl, carboxyl and carboxylic ester.

5. Process which comprises condensing with an anthraquinone compound reduction product, containing oxygen in the central nucleus thereof, in the presence of a condensing agent having an acid reaction, and at a temperature of from about 50° C. to about 150° C., a carbonyl compound of the general formula

wherein R represents one of the groups alkyl, aryl, hydroxyl and alkoxyl, $R_1$ represents any univalent residue, and $R_2$ represents one of the substituents hydrogen, halogen, hydroxyl, alkoxyl, alkyl, aryl, carboxyl and carboxylic ester.

6. Process which comprises condensing with an anthraquinone compound reduction product, containing oxygen in the central nucleus thereof, in the presence of a condensing agent having an acid reaction and at a temperature of from about 70° C. to about 110° C., a carbonyl compound of the general formula

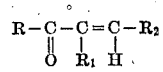

wherein R represents one of the groups alkyl, aryl, hydroxyl and alkoxyl, $R_1$ represents any univalent residue, and $R_2$ represents one of the substituents hydrogen, halogen, hydroxyl, alkoxyl, alkyl, aryl, carboxyl and carboxylic ester.

7. Process which comprises condensing with anthrone in the presence of sulfuric acid and at a temperature of from about 70° C. to about 110° C. a carbonyl compound of the general formula

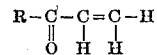

wherein R represents one of the groups phenyl and hydroxyl.

8. Process of preparing Bz-1-hydroxy-benzanthrone which comprises condensing anthrone in the presence of sulfuric acid with acrylic acid dissolved in glacial acetic acid at a temperature of from about 70° C. to about 110° C.

9. As new products Bz-nuclear-substituted benzanthrone compounds having the general formula:

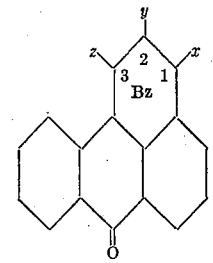

wherein $x$ represents one of the groups alkyl, aryl, alkoxyaryl and hydroxyl, $y$ represents one of the substituents hydrogen, acyl, aryl, and carboxylic ester, and $z$ represents one of the substituents hydrogen and aryl, which products are generally well-formed yellow to orange to brown crystalline compounds having definite melting points, soluble in concentrated sulfuric acid generally with a red to violet to blue coloration, having a strong fluorescence.

10. As new products Bz-nuclear-substituted benzanthrone compounds having the general formula:

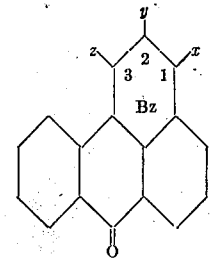

wherein $x$ represents one of the groups hydroxyl and phenyl, $y$ represents one of the substituents hydrogen, acyl, aryl, and carboxylic ester, and $z$ represents one of the substituents hydrogen and aryl, which products are generally well-formed yellow to orange to brown crystalline compounds having definite melting points, soluble in concentrated sulfuric acid generally with a red to violet to blue coloration, having a strong fluorescence.

11. As new products Bz-nuclear-substituted benzanthrone compounds having the general formula:

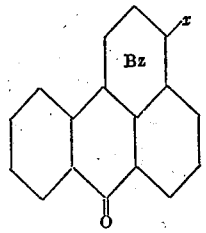

wherein $x$ represents one of the groups hydroxyl and phenyl, which products are generally well-formed yellow to reddish-orange crystalline compounds having definite melting points, soluble in concentrated sulfuric acid generally with a red to violet to blue coloration, having a strong fluorescence.

12. As a new product Bz-1-hydroxy-benzanthrone having the formula:

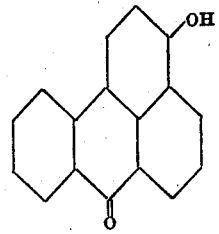

which crystallizes from high-boiling solvents in the shape of reddish-orange needles having the melting point of 317° C., soluble in aqueous alkaline solution and in concentrated sulfuric acid with a reddish-violet color showing a strong fluorescence.

In testimony whereof, we affix our signatures.

GEORG KRÄNZLEIN.
HEINRICH VOLLMANN.
HEINR. GREUNE.
ARTHUR WOLFRAM.